(12) United States Patent
Band et al.

(10) Patent No.: US 10,313,421 B2
(45) Date of Patent: Jun. 4, 2019

(54) PROVIDING ODATA SERVICE BASED ON SERVICE OPERATION EXECUTION FLOW

(71) Applicant: SAP SE, Walldorf (DE)

(72) Inventors: Om Band, Bangalore (IN); Suparna Deb, Bangalore (IN); Sripad Jade, Bangalore (IN); Sridhar Jayaraman, Bangalore (IN); Shiva Prasad Nayak, Bangalore (IN); Pradeep Panda, Bangalore (IN); Sabarish T S, Bangalore (IN)

(73) Assignee: SAP SE, Walldorf (DE)

( * ) Notice: Subject to any disclaimer, the term of this patent is extended or adjusted under 35 U.S.C. 154(b) by 295 days.

(21) Appl. No.: 15/345,841

(22) Filed: Nov. 8, 2016

(65) Prior Publication Data

US 2018/0131556 A1 May 10, 2018

(51) Int. Cl.
*G06F 15/173* (2006.01)
*H04L 29/08* (2006.01)
*H04L 29/06* (2006.01)

(52) U.S. Cl.
CPC .......... *H04L 67/02* (2013.01); *H04L 67/2823* (2013.01); *H04L 67/32* (2013.01); *H04L 67/42* (2013.01)

(58) Field of Classification Search
CPC ..... H04L 67/02; H04L 67/2823; H04L 67/32; H04L 67/42

USPC ......................................................... 709/223
See application file for complete search history.

(56) References Cited

U.S. PATENT DOCUMENTS

2015/0006135 A1* 1/2015 Deb .......................... G06F 8/34
703/6

FOREIGN PATENT DOCUMENTS

GB           2527022 A   * 12/2015   ............... G06F 8/34

* cited by examiner

*Primary Examiner* — Wing F Chan
*Assistant Examiner* — Joseph R Maniwang
(74) *Attorney, Agent, or Firm* — Buckley, Maschoff & Talwalkar LLC

(57) ABSTRACT

A method and system for providing an OData service based on a service operation execution flow is described. Initially a data source metadata is converted to an entity data model. Based on the entity data model, the service operation execution flow is generated that displays a process for executing a service operation. Next, one or more runtime configuration data are received to edit the generated service operation execution flow. The edited service operation execution flow defines a communication between a data source and a client requesting execution of the service operation. Finally, based on the edited service operation execution flow and the entity data model the Odata service is published to process a client request for executing the service operation.

18 Claims, 9 Drawing Sheets

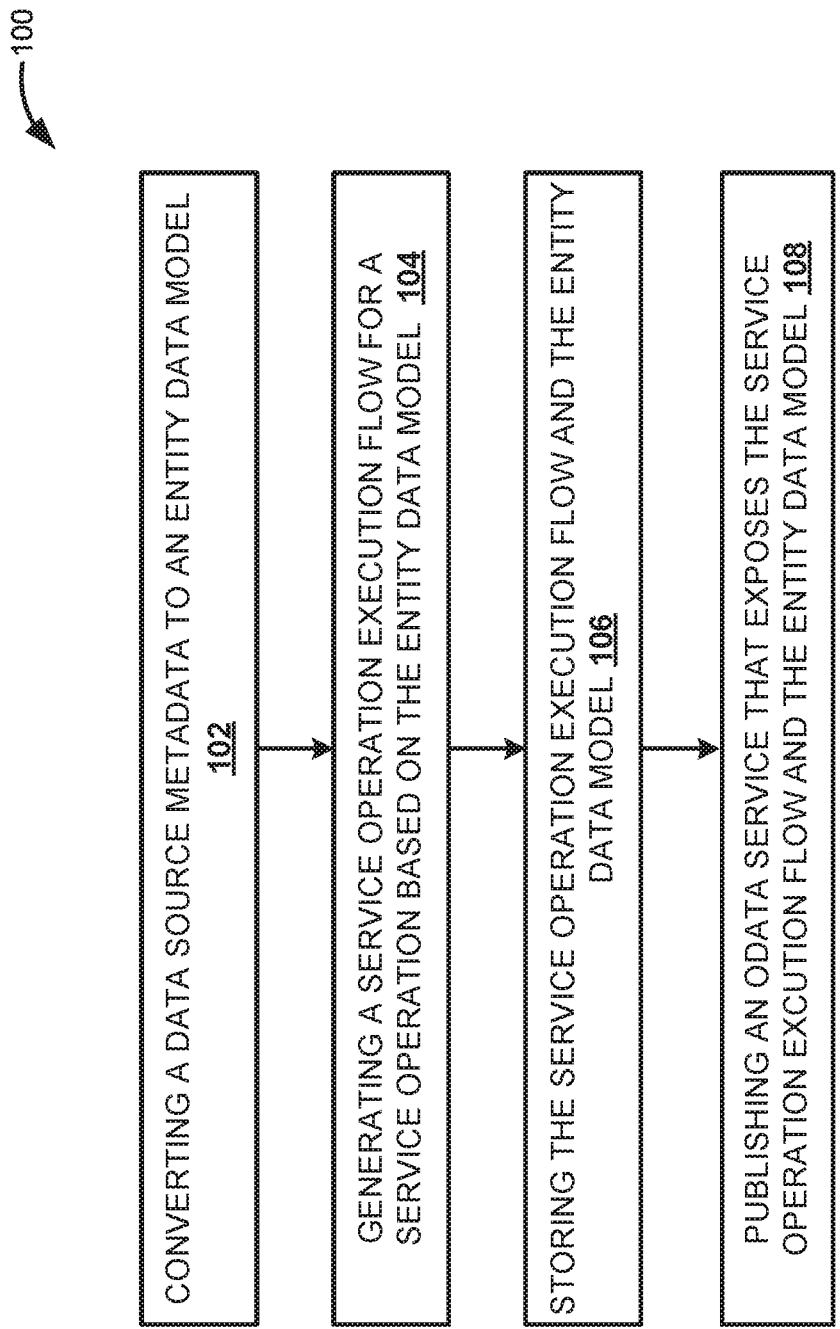

| NAME | DATA SOURCE | DETAILS | ACTION |
|---|---|---|---|
| ▦ GETCUSTOMERSSET | SOAP ⌄ | | |
| ◆ QUERY 502 | | | 🔗 |
| | CONFIGURE SOAP DATA SOURCE | | |
| ◆ | ENTITY SET | GETCUSTOMERS SET | 🔗 |
| ◆ | CRUDQ OPERATION | QUERY 502 | 🔗 |
| ◆ | WSDL | SALESORDER.WSDL   BROWSE... | 🔗 |
| ◆ | EXISTING FILES | SALES ORDER 506 | |
| | *OPERATION | GETCUSTOMERS 504 ⌄ | |
| | *END POINT | HTTP://10.53.199.77:8080/SALESOR 508 | |
| | | OK     CANCEL | |

FIG. 5

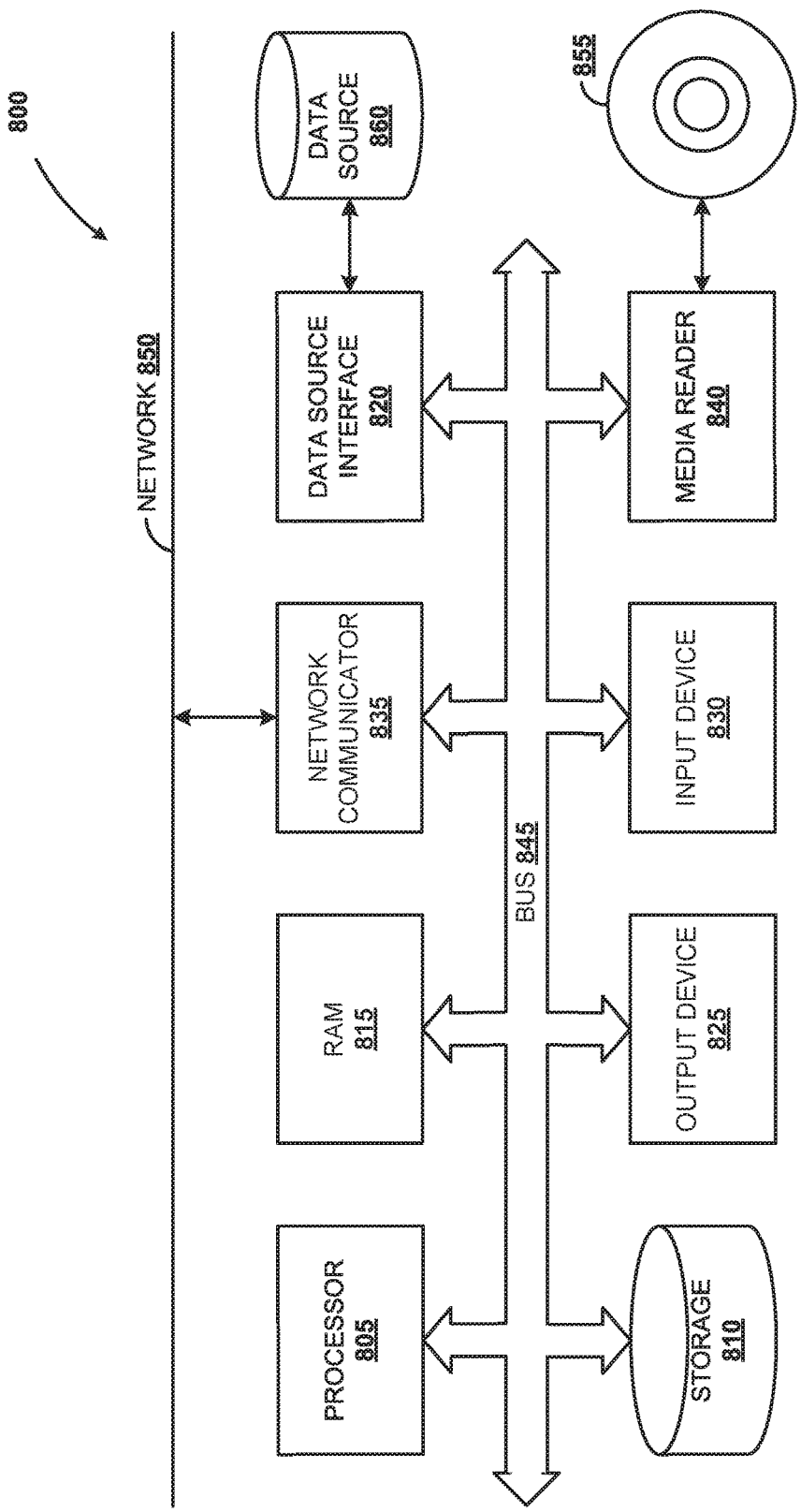

PROVIDING ODATA SERVICE BASED ON SERVICE OPERATION EXECUTION FLOW

BACKGROUND

In an enterprise, data is stored at multiple locations in different data formats. An Open data (Odata) provides a mechanism to represent the data in different data formats by a common data format. When a client request is received at the enterprise then the data in Odata format may be used to execute the client request. An Odata service may then forward the execution result to the client.

In some instances, a user at the enterprise, for example a system administrator, may want to modify the data execution or data communication process when handling a client request. For example, a system administrator may want to add a user authentication step before the result of execution is delivered to client. At present, Odata does not provide the flexibility to modify any parameter during handling of a client request, which is undesirable.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 1 is a block diagram illustrating a process to provide an OData service based on service operation execution flow, according to an embodiment.

FIG. 5 is an exemplary screenshot of a user interface binding a service operation "QUERY" to a service endpoint, according to an embodiment.

FIG. 8 is a block diagram illustrating an exemplary computer system, according to one embodiment.

DETAILED DESCRIPTION

Figure 2A:
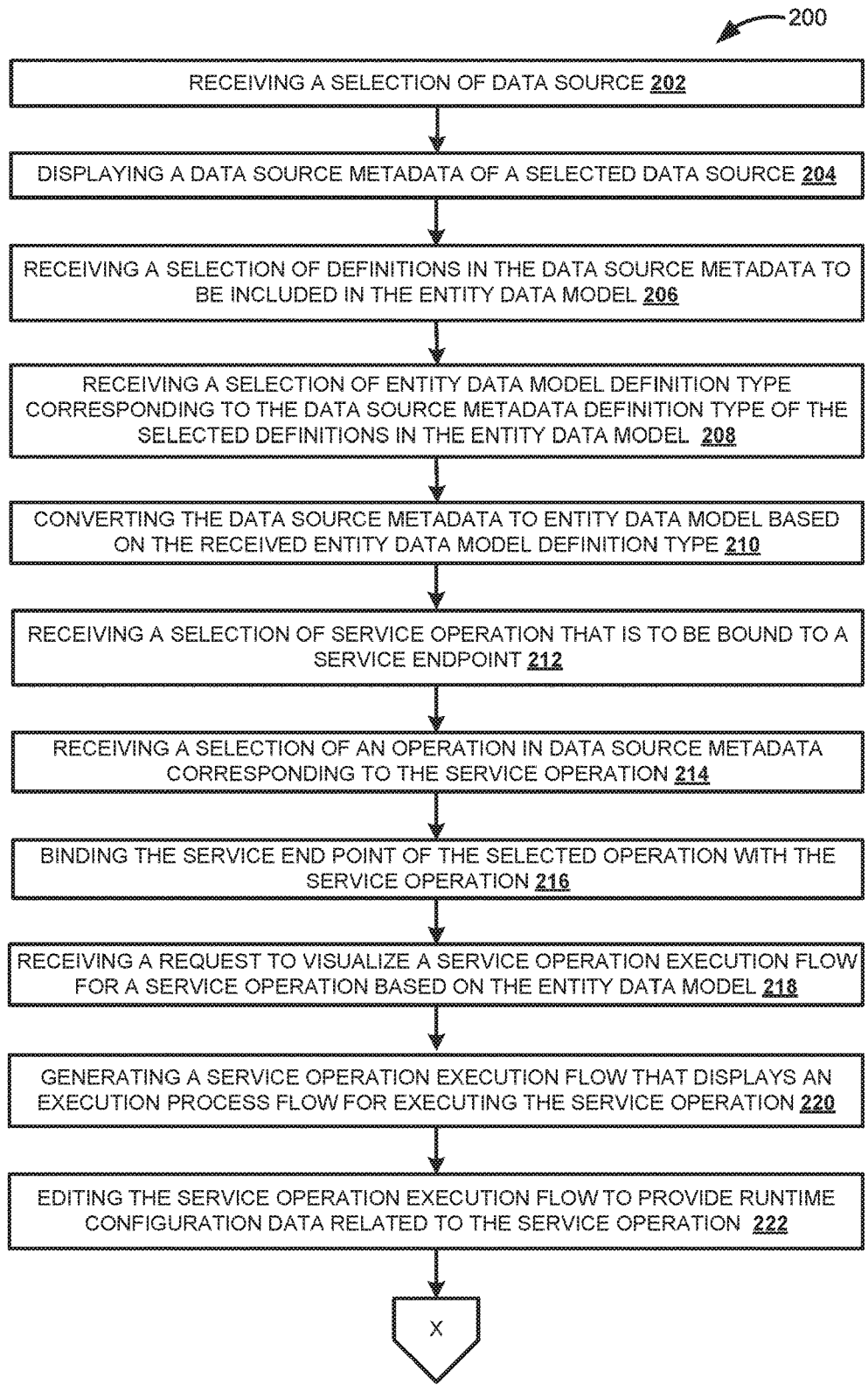
FIGS. 2A-2B is a detailed flow diagram illustrating a process to provide Odata service based on service operation execution flow, according to an embodiment.

Embodiments of system and method for providing an Odata service based on service operation execution flow are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

FIG. 1 is a block diagram illustrating a process 100 to provide an OData service based on service operation execution flow, according to an embodiment. Odata or Open data protocol defines a protocol for querying and updating data utilizing existing Web protocols, for example, Hyper Text Transmission Protocol (HTTP). An OData service exposes data via an Odata data model, which clients' may access with an OData client library and the OData protocol. In one embodiment, an entity data model is used as the underlying data model for Odata.

To provide the Odata service, initially a data source metadata is converted to an entity data model (102). In one embodiment, data may be stored or received from a data source. The data source may have a corresponding data source metadata that defines the structure of data stored or received from the data source. For example, a Simple Object Access Protocol (SOAP) web service may be a data source that has a corresponding SOAP web service metadata provided in a Web Service Description Language (WSDL) document. For example, a WSDL document for a SOAP web service "postal address locator" may include:
<message name="getTempRequest">
  <part name="zipcode" type="xsd:string"/>
</message>

The data source metadata may include several definitions, for example, data definition, operation definition, data link information, etc. that defines the structure of different data and operations included in the data. The data definition may be, for example, that a data elements is string. The operation definition may be, for example, a list of parameters that are to be provided as input for the service operation. The data or operation definitions in the data source metadata that are to be included in the entity data model are selected. The selected data or operation definitions are then represented as entities or relationships to obtain the entity data model.

The entity data model is a set of concepts that describe the structure of data, regardless of its stored form. In an entity data model the structure of data is defined by entities and relationships. An entity is an object with distinct properties. For example, an entity "Book" may have properties "Fountainhead" (book name), V0.2 (Version Number), and Ayn Rand (Author). An entity type represents structure of entities. For example, three entities "book 1", "book 2" and "book 3" have an entity type "book". The entity type book includes three properties: Book Name, Version Number, and Author. An entity set is a collection of entities that are of same type. For example, an entity set "books" can include the three entities "book 1", "book 2" and "book 3". A relationship may define association between different entities. In one embodiment, the entity data model obtained after conversion includes an entity set. For example, an entity data model for "employee record" may include:
<Entity Type Name="Customer">
<Key>
<Property Ref Name="CustomerID"/>
</Key>

Next a service operation execution flow is generated for a service operation based on the entity data model (104). Odata exposes a set of service operations that may be used to perform different operations on the underlying data. The service operations may include, for example, Create, Read, Update, Delete, or Query (CRUDQ) service operations. The service operation execution flow is a visualization of execution steps to execute the service operation. For example, when the service operation execution flow is generated for "Query" operation then the visualization includes: a sender, a receiver, a sender web service to send data, a data mapping to map the sender data to receiver format, and finally a receiver web service to forward the converted data to receiver. The generated service operation execution flow may then be edited to modify the execution flow of a service operation. For example, a user may select a "authenticate client" option for the service operation execution flow of a query operation. In this case when a client request for executing a query is received then the client may be authenticated before query result is sent to the client.

The entity data model and the service operation execution flow are then stored (106). Next an Odata service is published that exposes the entity data model and the service operation execution flow to a client (108). Clients use the exposed information and the received service operation execution flow to obtain result of the query request.

Figure 2B:
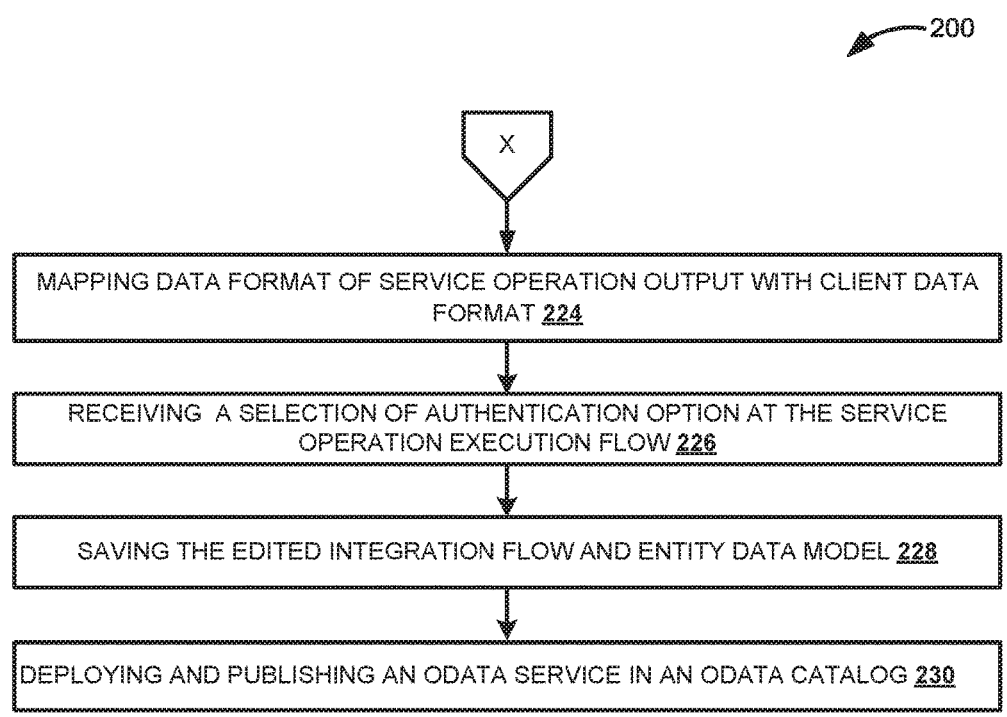

FIGS. 2A-2B is a detailed flow diagram illustrating a process 200 to provide Odata service based on service operation execution flow, according to an embodiment.

To provide the Odata service, initially a selection of data source is received (202). In one embodiment, a data source is selected to convert its metadata to entity data model. The selection of the data source may be received at a user interface. Different data sources may be storing or transmitting data in different formats. These different data sources may also be using different communication protocol for transmitting data. For example, the data source may be a Simple Object Access Protocol (SOAP) web service data source, which receives a request from a client and sends a response to the client. Web Services allow web servers to provide function like interfaces using standard HTTP messages.

Another example of data source may be Java Database Connectivity (JDBC™) that is an API used by Java™ application to directly communicate with the database. Next a data source metadata of the selected data source is displayed (204). The different data sources may have a corresponding data source metadata that includes, for example, definition of the underlying stored data, the data format in which the data source receives request or data from the client, the data format in which the data source sends data, etc. The definitions for the stored data may include, for example, an "integer" data type of a "telephone number" or input parameters for a "GET" service operation.

In one embodiment, the displayed data source metadata includes a list of data or operation definitions. The data or operation definitions included in the data source metadata, may be of a particular type. In one embodiment, the definition type in the data source metadata defines whether the definition is related to an operation or data. For example, a WSDL file may include a "get customer list", "customer id" that have a corresponding data source metadata definition types as "operation" and "string", respectively. The data source metadata definition type also provides information related to data type, for example string, Boolean, etc.

Next a selection of definitions in the data source metadata that is to be included in an entity data model is received (206). For example, a WSDL file may include several definitions including: "generate data", "get customers", "get customers response". A selection may be received for the "get customers" definition that the user wants to be included in the data model definition. Similar to the definitions in the data source metadata an entity data model also includes definitions. For example, an entity "get customer" in the entity data model may be of type entity type.

Next an entity data model definition type corresponding to the data source metadata definition type of the selected definitions in the data source metadata is received (208). For example, a selected "get customer list" definition in the WSDL file may be of type "operation". An entity data model definition type "entity type" may be received from a user at a user interface corresponding to the data source definition type "operation". In one embodiment, the entity data model definition type is received to change the data source metadata definition type of the selected definitions. For example, after receiving the data source entity type the "get customer" definition is an "entity type".

Based on the received entity data model definition type, the data source metadata is converted to an entity data model (210). In one embodiment, the selected data or operation definitions with the entity data model definition type are imported into the entity data model. The entity data model defines the different data and service operation definitions included in the data source metadata by entities and associations. In one embodiment, the various entities in the obtained entity data model are included in an entity set. For example, the entity data model may include an entity set "getcustomersset" with several entities "get customer request", "get customer response", etc.

Next a service operation selection is received to bind a service operation to a service endpoint (212). Odata allows a client to perform CRUDQ operations on the entity data model. Each of these CRUDQ operations are to be bound to service endpoint of the data source. In one embodiment, the data source may be that data source the metadata of which is converted to obtain the entity data model. A service endpoint is a location, for example a Uniform Resource Locator (URL), where a client can access the web service. For binding the service operation, a selection of an operation in the data source metadata corresponding to the selected service operation is received (214). A service end point corresponding to the selected operation is then bound to the service operation (216). In on embodiment, each of the CRUDQ operation is bound to same or different service endpoint based on the process explained in steps 212-216.

For example, consider a WSDL file including a SOAP data source metadata that defines data stored in a customer database table. The WSDL file includes a service operation "get product sales list" having a corresponding service endpoint "http://xxxx.salesOrderSOAPservices/". When the WSDL file is converted to a data model definition file then the "get product sales list" may be imported as an entity type in the entity data model definition. The data model definition may then provide CRUDQ operation for the "get production sales list" in the data model definition. Each of the CRUDQ operations are then mapped to different or same data source endpoint. For example, the Query service operation for the "get production sales list" entity set may be mapped to a "get customer" operation in the WSDL file. In this case, the service endpoint http://xxxx.salesOrderSOAPservice corresponding to the "get customer" operation is mapped to the query operation. A user can query data related to the "get production sales list" entity at the mapped service endpoint "http://xxxx.salesOrderSOAPservice".

Next a request is received to visualize a service operation execution flow for a service operation based on the entity data model (218). A service operation execution flow displays a series of steps to execute a particular service operation. In one embodiment, the service operation execution flow option is presented for service operations that are bound to the data source service endpoint. Based on the received request, a service operation execution flow is generated that displays an execution process flow for executing the service operation (220).

In one embodiment, a Business process model and notation (BPMN) is used for generating the service operation execution flow. A BPMN is an analytical representation or illustration of an organization business. BPMN provides a standard notation that is readily understandable. A diagram in BPMN is assembled from a set of core elements, categorized into three groups: flow objects, connecting objects and swim lanes. Flow objects, denoted by geometric figures such as circles, rectangles and diamonds, indicate specific events and activities. Flow objects are linked with connecting objects, which appear as solid, dashed or dotted lines that may include arrows to indicate process direction. Swim lanes are denoted as solid, straight lines running lengthwise within a rectangle called a pool. The swim lanes organize diverse flow objects into categories having similar functionality.

In one embodiment, a pre-defined service operation execution flow template may be provided that defines the integration flow for a particular service operation. For example, a pre-defined integration flow for a "query" service operation may define that a query service operation receives data using an Odata service, a query is executed to retrieve data, and the retrieved data is then forwarded to the client. The entity data model and the data source service endpoint may be provided as an input to the pre-defined integration flow template corresponding to the service operation. For example, when a selection is received to visualize a query operation on a "get customer" entity set then the "get customer" entity set and the data source end point corresponding to the query operation is provided as input for the pre-defined service operation execution flow template to obtain the service operation execution flow.

Next at steps 222-224 the generated service operation execution flow is edited. The generated service operation execution flow is edited to provide runtime configuration data related to the service operation (222). The runtime configuration data may include data that may be required for executing the service operation. For example, providing the runtime configuration data may include providing connection related data. The connection related data may include, for example, the web service endpoint address of a data source web service. For providing the runtime configuration data, the client can select a particular element in the service operation execution flow for which the runtime configuration data is to be provided. For example, when the user wants to provide runtime configuration data related to message format then a flow object representing message in the service operation execution flow may be selected.

In one embodiment, the service operation execution flow may be edited by receiving a data format mapping to map the data format of the service operation output with client data format (224). The data format mapping data may be received as one of the runtime configuration data at the service operation execution flow. The client data format may be a format in which the client displays the service operation output obtained after executing the service operation. For example, a get document may be defined to retrieve data for parameters "customer id" and "customer name" from the database. The get document output includes data values of "customer id" and "customer name" retrieved from the database. A client may display the result of the service operation output in a table that has fields "cust id" and "cust name", corresponding to the service operation output "customer id" and "customer name", respectively. In this case a data format mapping is received to map "customer id" to "cust id" and "customer name" to "cust name", respectively. During runtime, this mapping is used to transfer the retrieved "customer id" data value to "cust id" field of the client and the "customer name" data value to "cust name" field of the table, respectively.

In one embodiment, the generated service operation execution flow is edited to receive a selection of an authentication option at the service operation execution flow (226). An authentication option may include, for example, authenticating a client before processing a client request to process a service operation. The edited integration flow and the entity data model are then saved (228). As discussed above, an integration flow/edited integration flow is provided on each of the service operations, Create, Read, update, Delete, and Query (CRUDQ). Saving the service operation execution flow/edited service operation execution flow may include creating a combined service operation execution flow document that include service operation execution flow for the different service operations. The combined service operation execution flow may be an eXensible Markup Language (XML) file.

Finally an Odata service may be deployed and published at an Odata Catalog (230). The Odata catalog provides a list of Odata services that are available to a client. The Odata service exposes the combined service operation execution flow and the entity data model to a client. During runtime, when a client request for a service operation is received by the Odata service then the service operation output may be obtained based on the execution flow and the parameters defined in the service operation execution flow. The mapping in the service operation execution flow may be used to map the service operation output to client data format and the client web service connection detail is used to transfer the service operation output in client data format to the client.

In one embodiment, the client, for example a handheld device, may be provided with an application that has a web service endpoint of the Odata service. The application may use the web service endpoint to send client request to Odata service and receive results from the Odata service. The Odata service therefore allows a client to access data from any data source, for example, database, applications, etc. Further, the service operation execution flow provides a user the flexibility to modify any parameter related to execution of the service operation.

Figure 3:
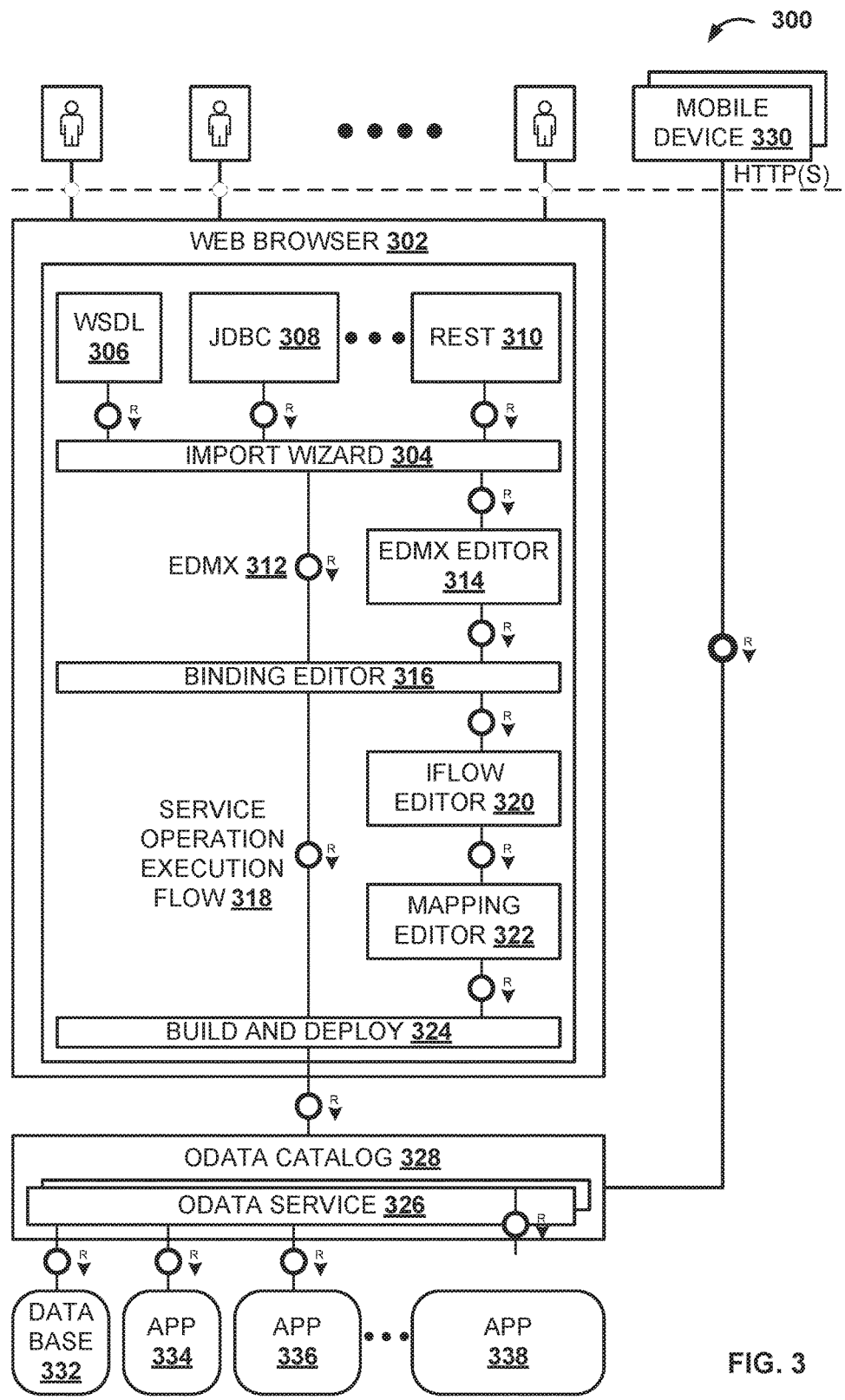
FIG. 3 is a block diagram illustrating a system for providing an Odata service based on a service operation execution flow, according to an embodiment.

FIG. 3 is a block diagram illustrating a system 300 for providing an Odata service based on a service operation execution flow, according to an embodiment. In one embodiment, the system 300 is hosted in a cloud. Cloud or cloud computing is a practice of using a network of remote servers hosted on the Internet to store, manage, and process data. In one embodiment, the cloud is a SAP HANA® Cloud. The system 300 includes a web browser 302 that include different modules to convert different data source metadata to entity data model, visualize a service operation execution, and build and deploy Odata service. The web browser 302 includes an import wizard 304 that is configured to convert a data source metadata, for example a Web Service Definition Language (WSDL) format 306, a Java™ database connectivity (JDBC) format 308, or Representational State Transfer (REST) format 310 to an entity data model. The entity data model may be provided in an Entity Data Model XML (EDMX) 312 document in Odata format. The web browser 302 includes an EDMX editor 314 that may be configured to check the syntactic correctness of the EDMX 312 document. The web browser 302 also includes a binding editor 316 configured to generate a service operation execution flow 318 that displays an execution process flow for executing a service operation corresponding to the entity set.

The web browser 302 includes an Iflow editor 320 configured to receive runtime configuration parameter values to edit the generated service operation execution flow. The web browser 302 includes a mapping editor 322 that is defined to map the output of service operation execution with a client data format. The web browser 302 also includes a build and deploy module 324 that is defined to publish Odata service 326 in an Odata catalog 328. A client, for example, a mobile device 330 can use an application to access the Odata service 326 for performing different service operations on the data stored at different data sources, for example, database 332 and applications (APP) 334, 336, and 338.

Figure 4:
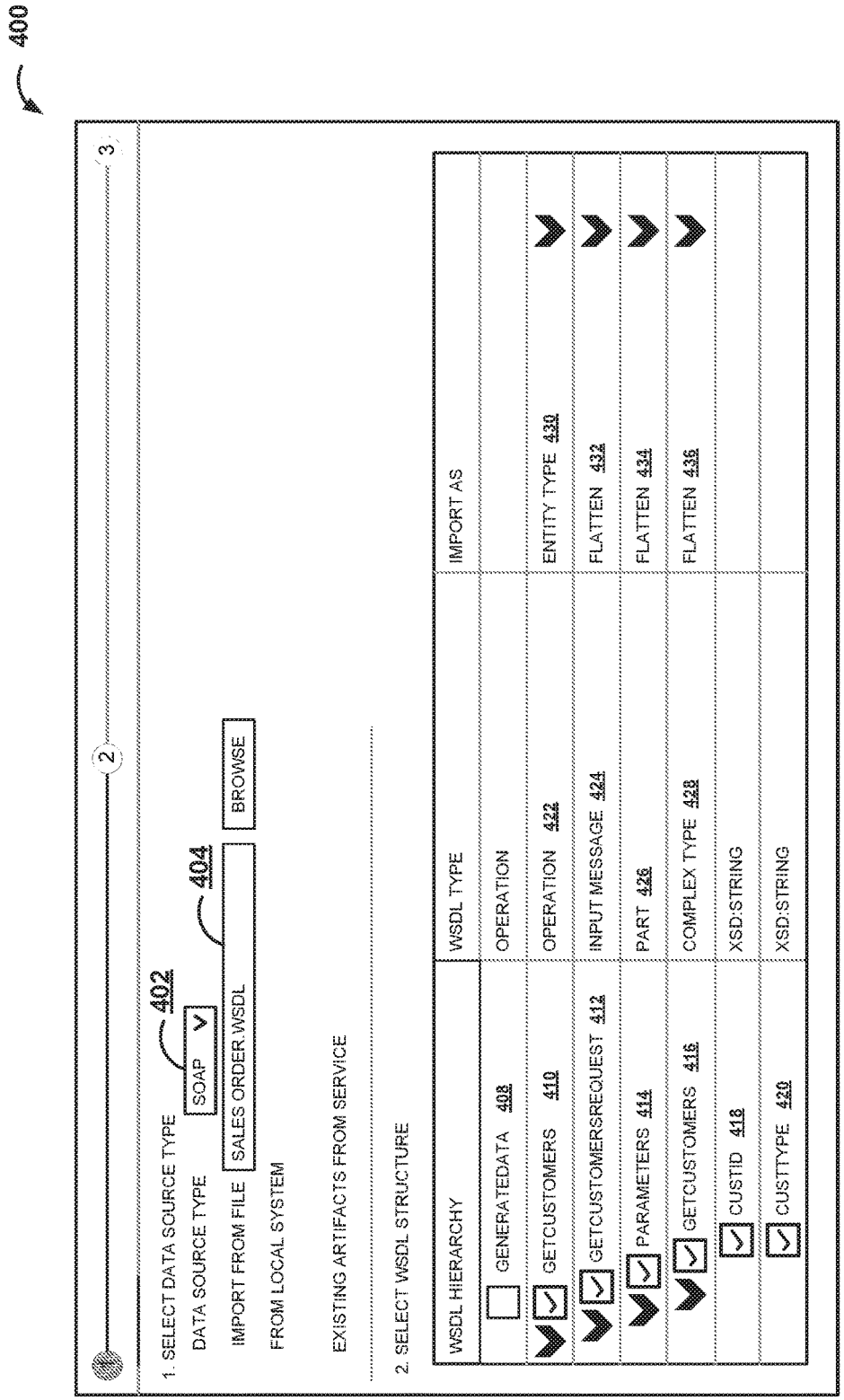
FIG. 4 is an exemplary screenshot of a user interface illustrating a process to convert a data source metadata to entity data model, according to an embodiment.

FIG. 4 is an exemplary screenshot of a user interface 400 illustrating a process to convert a data source metadata to entity data model, according to an embodiment. To convert the data source metadata, a data source "SOAP" 402 is selected and the corresponding data source metadata of this data source stored in a "SALES ORDER.WSDL" file 404 is imported from a database. The definitions "GENERATEDATA" 408, "GETCUSTOMERS" 410, "GETCUSTOMERSREQUEST" 412 included in the "SALESORDER" WSDL file 406 is then shown at the user interface. One or more definitions in the data source metadata that are to be included in an entity data model are then selected. For example, the definitions "GETCUSTOMERS" 410 and "GETCUSTOMERSREQUEST" 412 are selected. When a definition is selected then sub-definitions and properties of definition elements of the selected definition are automatically selected. For example, when a definition "GETCUSTOMERREQUEST" 412 is selected then the properties "PARAMETERS" 414, "CUSTID" 418, "CUSTTYPE" 420 and the sub-definition element "GETCUSTOMERS" 416 are automatically selected.

The data source metadata is converted to entity data model by selecting an entity data model definition type corresponding to the data model definition type of the selected definitions. As shown, the entity data model is obtained by importing the definitions "GETCUSTOMERS" 410, "GETCUSTOMERREQUEST" 412, "PARAMETERS" 414, "GETCUSTOMERS" 416 that has a data source metadata type (WSDL Type) as "OPERATION" 422, "INPUT MESSAGE" 424, "PART" 426, and "COMPLEX TYPE" 428 as "ENTITY TYPE" 430, "FLATTEN" 432, "FLATTEN" 434, and "FLATTEN" 436, respectively in the entity data model.

FIG. 5 is an exemplary screenshot of a user interface 500 binding a service operation "QUERY" to a service endpoint, according to an embodiment. The service operation "QUERY" 502 that is to be bound to a service end point is selected. A selection of a "GETCUSTOMERS" operation 504 from the data source metadata file "SALESORDER" file 506 is received corresponding to the service operation "QUERY" 502. Based on the selected operation the corresponding service endpoint "HTTP://10.53.199.77:8080/SALESOR" 508 is bound to the "QUERY" service operation 502.

Figure 6:
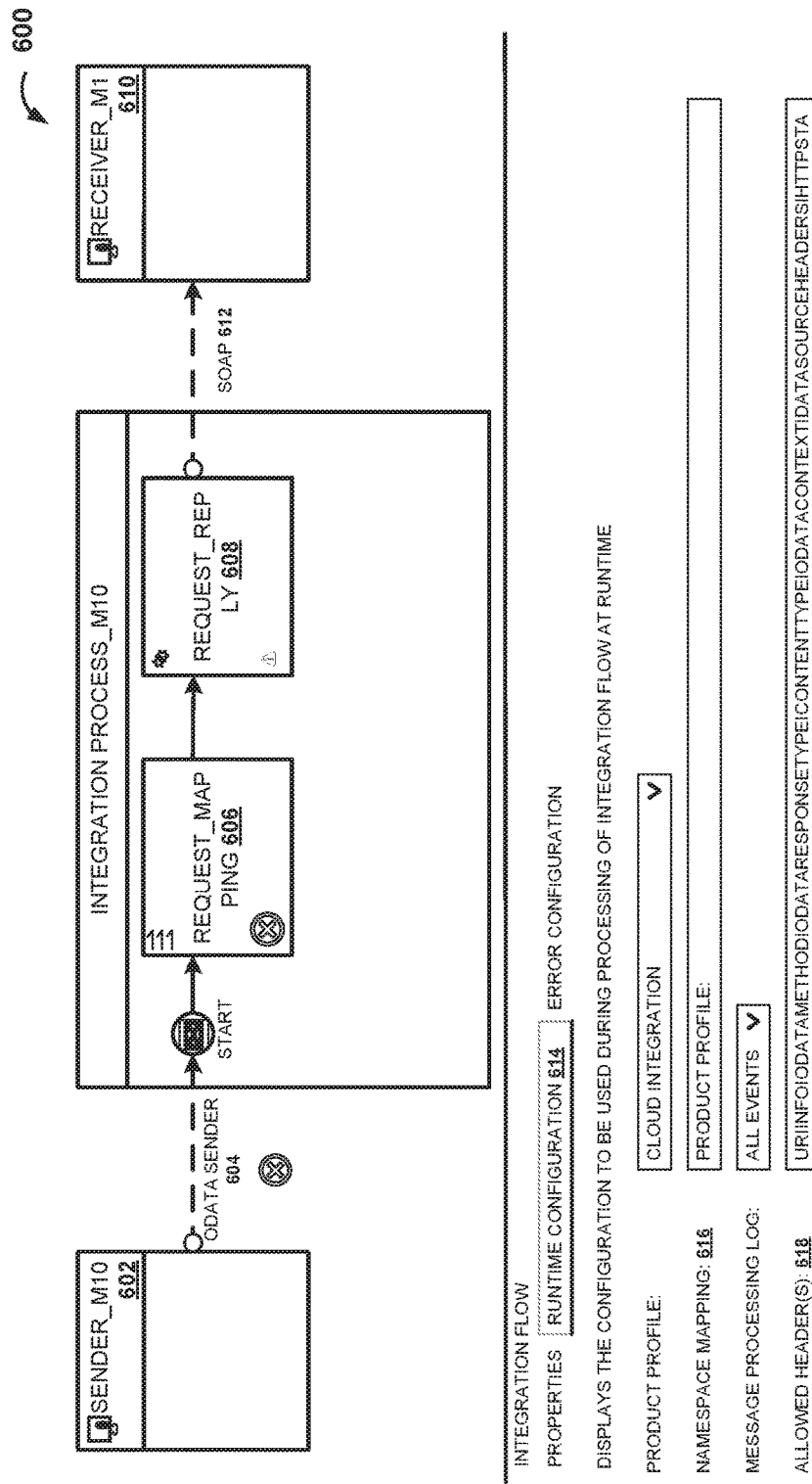
FIG. 6 is an exemplary screenshot of a user interface illustrating a service operation execution flow, according to an embodiment.

FIG. 6 is an exemplary screenshot of a user interface 600 illustrating a service operation execution flow, according to an embodiment. The service operation execution flow includes a sender (SENDER_M10) 602 that sends data using an OData SENDER 604 to a "REQUEST MAPPING" module 606. The "REQUEST MAPPING" module 606 maps the result to a "REQUEST REPLY" module 608 that finally forwards the data reply to a receiver (RECEIVER_M1) 610 using SOAP 612. The service operation execution flow also displays runtime configuration window 614 that allows a user to modify/provide values for different runtime configuration parameters, for example, "NAMESPACE MAPPING" 616 and "ALLOWED HEADERS" 618.

Figure 7:
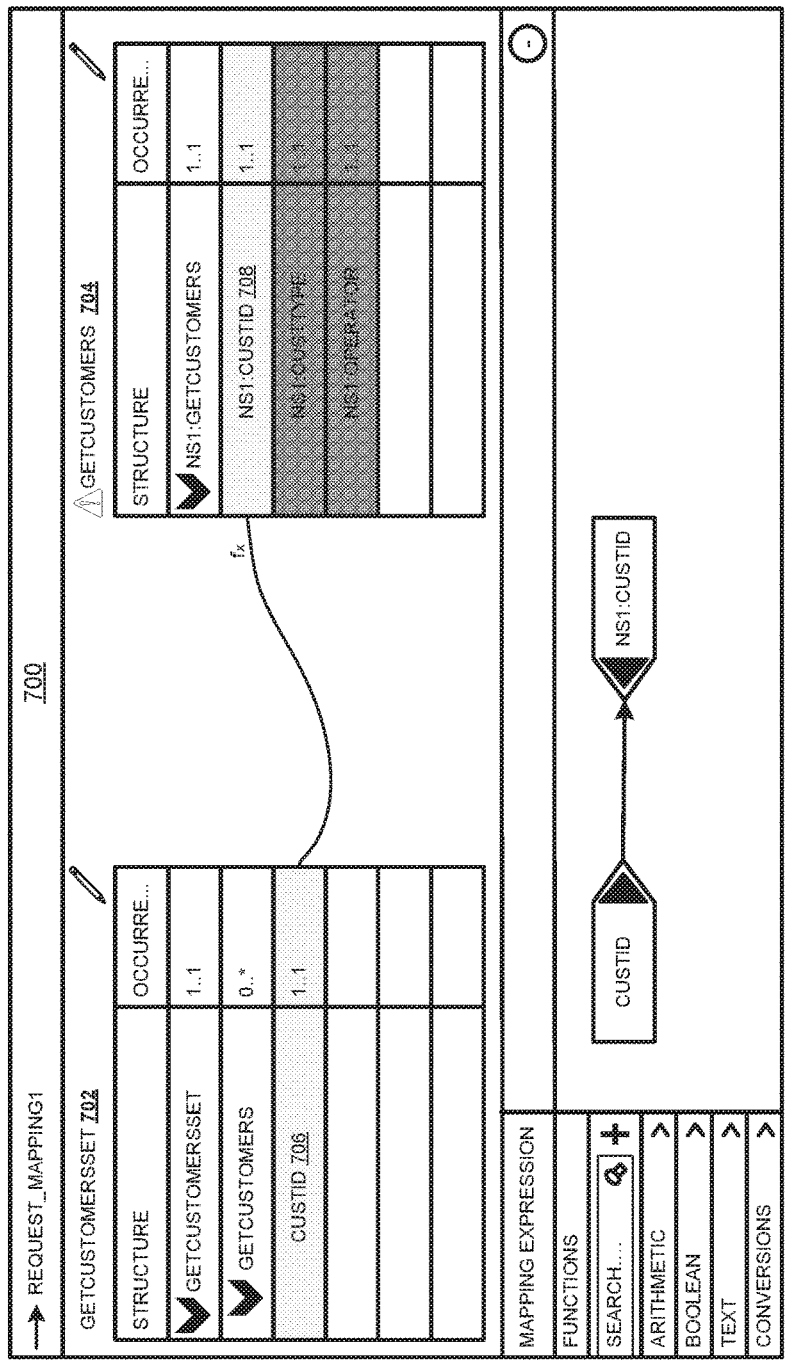
FIG. 7 is an exemplary screenshot of a user interface illustrating a mapping of a service operation output to client format, according to an embodiment.

FIG. 7 is an exemplary screenshot of a user interface 700 illustrating a mapping of a service operation output to client format, according to an embodiment. The "GETCUSTOMERSSET" 702 includes a list of definition names in the service operation output that are mapped to the definition names in the "GETCUSTOMERS" client file 704. The "GETCUSOMTERS" client file 704 includes the list of definition names in the client format. As shown, the definition name CUSTID 706 in the "GETCUSTONTERSSET" 702 is mapped to NS1:CUSTID 708 in the "GETCUSTOMERS" client file 704.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

FIG. 8 is a block diagram of an exemplary computer system 800. The computer system 800 includes a processor 805 that executes software instructions or code stored on a computer readable storage medium 855 to perform the above-illustrated methods. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for providing an Odata service based on a service operation execution flow, the method comprising:
   converting a data source metadata to an entity data model;
   based on the entity data model, generating the service operation execution flow that displays a process for executing a service operation;
   receiving one or more runtime configuration data to edit the generated service operation execution flow, wherein the edited service operation execution flow defines a communication between a data source and a client requesting execution of the service operation;
   saving, in a memory of the computer, the edited service operation execution flow and the entity data model; and
   based on the edited service operation execution flow and the entity data model, publishing the Odata service to process a client request for executing the service operation.

2. The computer implemented method according to claim 1, wherein generating the service operation execution flow includes:
   receiving a selection of a service operation for which a service operation execution flow is to be generated;
   providing the entity data model as input to a service operation execution flow template corresponding to the selected service operation; and
   based on the service operation execution flow template and the entity data model, generating the service operation execution flow.

3. The computer implemented method according to claim 1, wherein converting the data source metadata to the entity data model includes:
   receiving a selection of definitions in the data source metadata to be included in the entity data model;
   receiving a selection of entity data model definition type corresponding to the data source metadata definition type of the data source metadata; and converting the data source metadata to the entity data model based on the received entity data model definition type.

4. The computer implemented method according to claim 1, further comprising:
receiving a selection of a service operation that is to be bound to a service endpoint;
receiving a selection of an operation in data source metadata corresponding to the service operation; and
binding the service end point of the selected operation to the service operation.

5. The computer implemented method according to claim 1, wherein receiving the one or more runtime configuration data includes:
mapping a data format of an output of the service operation with a client data format.

6. The computer implemented method according to claim 1, wherein receiving the one or more runtime configuration data includes:
receiving a selection of an authentication option at the service operation execution flow.

7. A computer system for providing an Odata service based on a service operation execution flow, comprising:
a computer memory to store program code; and
a processor to execute the program code to:
convert a data source metadata to an entity data model;
based on the entity data model, generate the service operation execution flow that displays a process for executing a service operation;
receive one or more runtime configuration data to edit the generated service operation execution flow, wherein the edited service operation execution flow defines a communication between a data source and a client requesting execution of the service operation;
save the edited service operation execution flow and the entity data model; and
based on the edited service operation execution flow and the entity data model, publish the Odata service to process a client request for executing the service operation.

8. The system of claim 7, wherein the processor further executes the program code to:
receive a selection of a service operation for which a service operation execution flow is to be generated;
provide the entity data model as input to a service operation execution flow template corresponding to the selected service operation; and
based on the service operation execution flow template and the entity data model, generate the service operation execution flow.

9. The system of claim 7, wherein the processor further executes the program code to:
receive a selection of definitions in the data source metadata to be included in the entity data model;
receive a selection of entity data model definition type corresponding to the data source metadata definition type of the data source metadata; and
convert the data source metadata to the entity data model based on the received entity data model definition type.

10. The system of claim 7, wherein the processor further executes the program code to:
receive a selection of a service operation that is to be bound to a service endpoint;
receive a selection of an operation in data source metadata corresponding to the service operation; and
bind the service end point of the selected operation to the service operation.

11. The system of claim 7, wherein the processor further executes the program code to:
map a data format of an output of the service operation with a client data format.

12. The system of claim 7, wherein the processor further executes the program code to:
receive a selection of an authentication option at the service operation execution flow.

13. A non-transitory computer-readable medium to store instructions, which when executed by a computer, cause the computer to perform operations comprising:
convert a data source metadata to an entity data model;
based on the entity data model, generate a service operation execution flow that displays a process for executing a service operation;
receive one or more runtime configuration data to edit the generated service operation execution flow, wherein the edited service operation execution flow defines a communication between a data source and a client requesting execution of the service operation;
save the edited service operation execution flow and the entity data model; and
based on the edited service operation execution flow and the entity data model, publish an Odata service to process a client request for executing the service operation.

14. The computer-readable medium of claim 13, further comprises instructions which when executed by the computer further cause the computer to:
receive a selection of a service operation for which a service operation execution flow is to be generated;
provide the entity data model as input to a service operation execution flow template corresponding to the selected service operation; and
based on the service operation execution flow template and the entity data model, generate the service operation execution flow.

15. The computer-readable medium of claim 13, further comprises instructions which when executed by the computer further cause the computer to:
receive a selection of definitions in the data source metadata to be included in the entity data model;
receive a selection of entity data model definition type corresponding to the data source metadata definition type of the data source metadata; and
convert the data source metadata to the entity data model based on the received entity data model definition type.

16. The computer-readable medium of claim 13, further comprises instructions which when executed by the computer further cause the computer to:
receive a selection of a service operation that is to be bound to a service endpoint;
receive a selection of an operation in data source metadata corresponding to the service operation; and
bind the service end point of the selected operation to the service operation.

17. The computer-readable medium of claim 13, further comprises instructions which when executed by the computer further cause the computer to:
map a data format of an output of the service operation with client data format.

18. The computer-readable medium of claim 13, further comprises instructions which when executed by the computer further cause the computer to:

receive a selection of an authentication option at the service operation execution flow.

\* \* \* \* \*